(12) United States Patent
Bell et al.

(10) Patent No.: US 6,522,029 B1
(45) Date of Patent: Feb. 18, 2003

(54) REMOTE KEYLESS ENTRY SYSTEM FOR MOTOR VEHICLES

(75) Inventors: Joseph A. Bell, Markle, IN (US); Daniel L. Hilaire, Fort Wayne, IN (US)

(73) Assignee: International Truck Intellectual Property Company, L.L.C., Warrenville, IL (US)

(*) Notice: Subject to any disclaimer, the term of this patent is extended or adjusted under 35 U.S.C. 154(b) by 93 days.

(21) Appl. No.: 09/702,152

(22) Filed: Oct. 30, 2000

(51) Int. Cl.[7] ............................................. B60R 22/00
(52) U.S. Cl. .................... 307/10.6; 307/10.8; 123/179.2
(58) Field of Search ............................... 307/10.6, 10.8; 362/465, 541, 499; 123/179.2, 179.4; 340/457.3

(56) References Cited

U.S. PATENT DOCUMENTS

| | | | | |
|---|---|---|---|---|
| 4,295,540 A | * | 10/1981 | Hildebrecht | 123/198 D |
| 4,928,036 A | * | 5/1990 | Abboud | 307/10.1 |
| 5,406,171 A | * | 4/1995 | Moody | 307/10.8 |
| 5,593,367 A | * | 1/1997 | Eavenson et al. | 123/179.4 |
| 5,614,788 A | * | 3/1997 | Mullins et al. | 307/10.8 |
| 5,757,086 A | * | 5/1998 | Nagashima | 123/179.2 |
| 5,791,407 A | * | 8/1998 | Hammons | 123/142.5 E |
| 6,351,703 B1 | * | 2/2002 | Avery, Jr. | 123/179.2 |
| 6,392,534 B1 | * | 5/2002 | Flick | 340/426 |

* cited by examiner

Primary Examiner—Brian Sircus
Assistant Examiner—Sharon Polk
(74) Attorney, Agent, or Firm—Jeffrey P. Calfa; Neil T. Powell; Dennis Kelly Sullivan

(57) ABSTRACT

A keyless entry system for a motor vehicle is modified to be operable when the vehicle's engine is running and the vehicle's park brake is set. Keyless entry systems conventionally include an ignition switch position signal source and a door lock module having an enable input connected to the source of the ignition position signal. The disclosure teaches connecting the output of the ignition switch position sensor to the door lock modulo enable input through the part brake lamp. The enable input to the door lock module is then connected in common with the a park brake lamp switch. When the park brake lamp switch is closed by setting the park brake and activates the park brake lamp, the ignition position feed signal on the enable input is sunk by the switch and the potential level on the enable Is reduced, enabling the door lock module to operate as though the ignition switch had been moved to off.

9 Claims, 2 Drawing Sheets

REMOTE KEYLESS ENTRY SYSTEM FOR MOTOR VEHICLES

BACKGROUND OF THE INVENTION

1. Field of the Invention

The present invention relates to keyless entry systems for motor vehicles and more particularly to a keyless entry system for trucks which is operable during certain periods when the vehicle is left running.

2. Description of the Prior Art

Keyless entry systems to motor vehicles have become a common and popular feature on automobiles. Truck manufacturers have followed the lead of automobile manufacturers and added automotive type keyless entry systems to trucks. However, keyless entry systems have features adapted for common automotive operation which are less appropriate for trucks. Chief among these features is that automotive keyless entry systems are designed to be inoperable if the motor vehicle Ignition switch is in the run position. The door lock modules of the prior art have an enable input connected to a signal source indicative of the position of the ignition switch. If the ignition switch is in the run position the door lock module is defeated. An intention here is that car drivers not be encouraged to leave their cars running while locked and unattended. Leaving a gasoline engine running unattended is also highly inefficient. It is, also undesirable that the keyless entry system be operational when a vehicle is in motion.

Trucks, unlike automobiles, typically use diesel engines, and truck drivers commonly leave such engines running with the vehicle unattended for short breaks at rest areas. Given the occasional difficulty of restarting diesel engines, particularly in cold weather, and the low fuel consumption of diesels at idle, it is much more reasonable to leave a diesel running during a break than a gasoline fired internal combustion engine. Truck drivers have good reason to be able to use a keyless entry system to lock and unlock their rigs while the vehicle is left running, but the vehicle is parked. It would be advantageous to truck manufacturers to be able to continue to use automotive keyless systems with a minimum of modifications to order to continue to enjoy the low cost such systems have due to the large manufacturing runs provided by the automobile industry.

While it is possible to simply disconnect the door locking mechanisms of a keyless entry system from the ignition switch, such an action undesirable consequences. The keyless entry system would be active when the vehicle was in motion. Interior dome light mechanisms would remain on a sixty-second dimming cycle. This could have the result that the vehicle could be in motion with the dome light on.

SUMMARY OF THE INVENTION

The invention provides a keyless entry system for a motor vehicle which is operable when the vehicle's engine is running and the vehicle's park brake is set. The keyless entry system includes an ignition position signal source and a door lock module having an enable input connected to be responsive to an output from the ignition position signal source. The ignition position feed signal is connected to the door lock module enable through a park brake lamp. As a result the enable input to the door lock module is then connected in common with one terminal each of the a park brake lamp switch and the park brake lamp. When the park brake lamp switch is closed by setting the park brake, the ignition switch position signal on the enable input is sunk by the park brake switch and the potential level on the enable input is reduced, enabling the door lock module to operate as though the ignition switch had been moved to off. Operation of the door lock module is otherwise unaffected.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
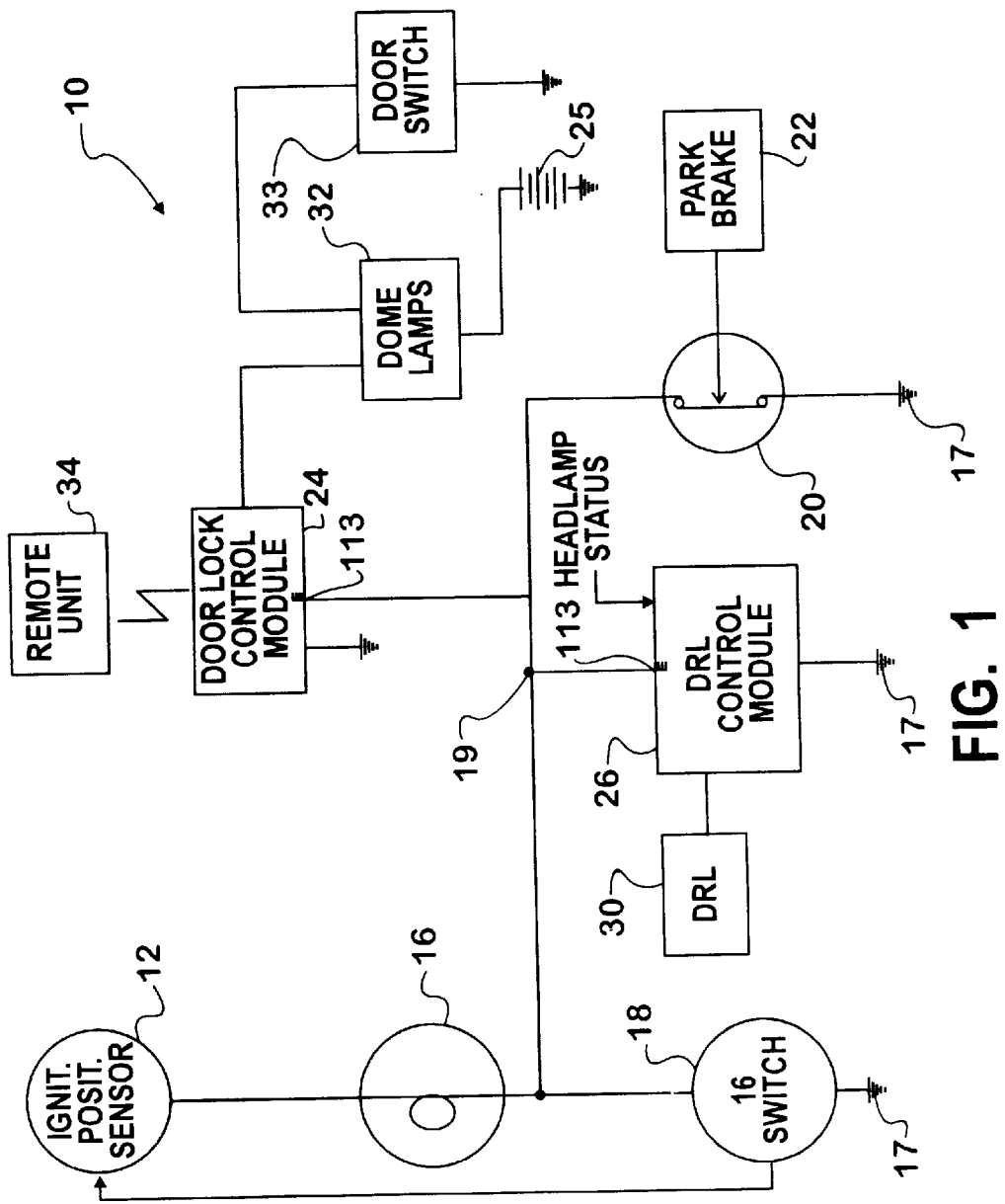
FIG. 1 is a block diagram schematic of the invention.

Referring now to FIG. 1, the invention will be described with reference to a preferred embodiment. A remote keyless entry system 10 for a motor vehicle is operable both when an ignition switch position sensor 12 is in the off position, and when the ignition switch 18 is in the run position and a vehicle park brake 22 is set, but not otherwise.

Placement of ignition switch 18 in the run or start positions causes an ignition position sensor 12 to connect one terminal of a park brake set lamp 16 to vehicle power. Lamp 16 is illuminated when current flows through the lamp which occurs when the remaining terminal of lamp 16 is connected to chassis ground 17, either by closure of park brake lamp switch 20, or back through ignition switch 18 when the switch is held in. The start position. The position of Switch 20 is directly controlled by the position of the park brake 22. When the park brake 22 is set, switch 20 is closed completing a circuit and illuminating lamp 16 if sensor 12 indicates that ignition switch 18 is in the run or start positions. When park lamp switch 20 is open the voltage level on bus 19 takes the level of the ignition position indication or feed signal from sensor 12, which may be either high (ignition 18 to run, or start) or low (ignition 18 to off) which is applied to the enable inputs (E) 113 and 115 of door lock control module 24 and DRL control module 26, respectively.

The enablement or disablement of the door lock module 24 and the daytime running fight control module 26 is controlled by the signal level on bus 19, which is applied to enable inputs for the door lock module and the daytime running light control module. An enabling signal for the door lock module 24 is a low signal, corresponding to chassis ground. Power is provided these components by connections (not shown) to the vehicle battery 25. Daylight running lights control module (DRL Control Module) 26, which controls the illumination of a vehicle's daytime running lights (DRL) 30, has an enable input connected to bus 19. Daytime running lights 30 are allowed to be on only if bus 19 is high, i.e. ignition position sensor 18 indicates that ignition switch 12 is in the run, or start, positions, park lamp switch 20 is open, i.e. the park brake 22 is not set, and the vehicle's headlamps are off. DRL control module 26 provides an alterative pull up path for bus 19 if park lamp 16 is burned out or missing.

A dome lamp control element is integral with door lock module 24 and provides timed dimming of an interior vehicle dome light 32 after closure of a door position switch 33 under certain circumstances. Dome lamp timing is enabled if the voltage level on bus 19 is low, i.e. switch 12 is moved to the off position, or park brake 22 is set, regardless of ignition switch position, and the remote unit 34 is used to unlock the door of the vehicle. If the ignition switch 12 is in the run position and park lamp switch 20 is open, then dome lamp 32 is off if door 33 is closed.

Lastly a conventional door lock module 24 is connected to bus 19. In the prior art a door lock module 24 installed on a truck received the output of an ignition position feed source 12 directly on its enable input, disabling module 24 when the ignition switch 18 was in the run position. However, with the enable input to door lock module 24 connected to bus 19, door lock module 24 can be activated for remote operation from a radio remote unit 34 by setting park brake 22 to close park lamp switch 20 and then by pulling bus 19 to chassis ground 17. As a result, door lock module 24 is active whenever ignition switch 12 is in the off position, or, while switch 12 is in the on position, park lamp switch 20 is closed by setting park brake 22.

Figure 2:
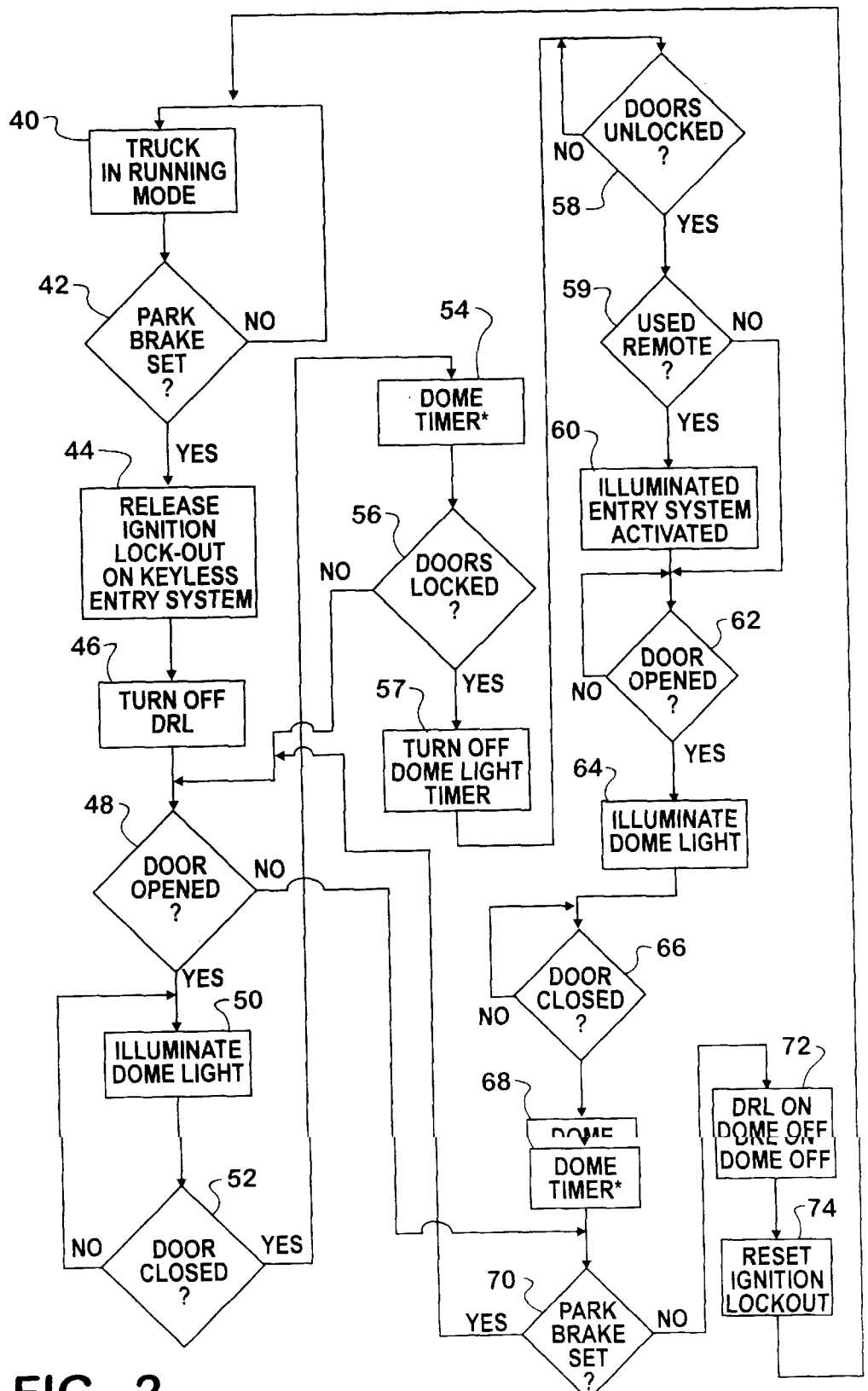
FIG. 2 is a flow chart illustrating operation of the invention.

FIG. 2 is a flow chart illustrating operation of the keyless entry system 10. Although operation is illustrated with reference to a flow diagram, operation of the preferred embodiment is not carried out using a programmable controller. Rather, the steps of the flow diagram illustrate a typical sequence of events describing the operation of the keyless entry system, and other truck components. Initially a truck on which the keyless entry system 10 is installed is in a running condition or "running mode" 40. Running mode means the ignition position sensor 12 indicates that switch 18 is the run position and that the park brake 22 is not set. In running mode the remote door lock actuation mechanism of door lock module 24 is unavailable. Since the invention modifies keyless entry system 10 response only for a vehicle on which the engine should be on, the possibility that the vehicle engine is off is ignored. Once the park brake is set 42 running mode is exited and the door lock module 24 is made operative. In other words, the ignition switch locknut of the keyless entry system is released (step 44). At the same time the daytime running light control module 26 turns off the daytime running lights 30 (step 46).

Once the park brake is set, the system waits for a door to open indicated by a door switch 33 (step 48). If no door is ever opened (the NO branch from step 48), it may be assumed that the park brake is eventually released (the branch NO from step 70) preparatory to returning the vehicle to running mode. In this case the dome timer element is forced to expire. The DRL 30 are also activated (step 72), but only if the headlamps are not illuminated as indicated to DRL control module 26 by a headlamp status signal. The ignition lockout is reset (step 74) to insure that the locks cannot be activated while the vehicle is in motion. Operation has then returned to running mode 40.

Once door switch 33 indicates that a door has opened, the YES branch from step 48 followed and the vehicle dome light illuminates (step 50). At this point the driver will typically close the doors (step 52). It is possible that a driver will attempt to move the vehicle with the door open (requiring the park brake to be released) however this possibility is ignored in the flow chart for the sake of simplicity. Under such circumstances it will be understood that the vehicle returns to running mode. Closure of the door results in the dome lamp being extinguished under the control of a dome control module (step 54). The doors are now indicated to be locked (step 6) although they can be locked before closure of the doors. If the doors are never locked the possibility remains that they may be reopened. This is reflected by the NO branch running from step 56, back to step 48. Along the YES branch from step 56 the system turns off the dome light timer element (step 57) and waits for the doors to be unlocked (step 58), reflecting the situation where a driver left the vehicle for a time and then returned. Again the possibility exists that a door was opened, then closed and then locked without anyone exiting the vehicle. While this is not reflected in the flow chart it will be understood that if at anytime the park brake is released, the vehicle returns to running mode.

How the doors are unlocked affects operation of the door lock module 24. The doors may be unlocked manually, either from outside or inside the truck, or by use of the remote unit 34. Step 60 reflects activation of an illuminated entry system, which times extinguishment of the dome lights after closure of a door The time extinguishment feature is activated only if the remote unit 34 was held to unlock the door (the YES branch from stop 59). Once the door is opened (step 62) the dome light is illuminated (step 64). Once the door is closed (step 66) the dome timer controls extinguishing the dome light (step 68), unless the park brake is released before the timer expires (step 70) or if the NO branch was taken from step 59, in which case closure of a door extinguishes the dome light. From step 70 along the NO branch (indicating that the park brake is released) steps 72 and 74 are executed as described above to return the vehicle to operating condition. The YES branch reflects the possibility that a driver may choose to reexit the vehicle and returns vehicle condition to the state reflected as step 48.

The present invention allows the use of conventional remote keyless entry systems, but gives such systems a behavior more accommodating to truck drivers. Since the invention requires only rewiring external to the door locking module, automotive systems may continue to be used. The problems resulting from the simple disconnection of the door locking mechanisms of a keyless entry system from the ignition switch are also avoided. The keyless entry system continues to be inactive when a vehicle might be in motion. Interior dome lighting remains on a timed extinguishment basis, with the added benefit that the light may be immediately extinguished if a driver prepares to move his or her vehicle.

While the invention is shown in only one of its forms, it is not thus limited but is susceptible to various changes and modifications without departing from the spirit and scope of the invention.

What is claimed is:

1. A keyless entry system for a motor vehicle, comprising:
   a common bus;
   an ignition position sensor coupled to apply an ignition position signal to the common bus;
   a remotely actuable door lock module having an enable input tied to the common bus;
   a park brake; and
   a park bake lamp switch having an open state and a closed state responsive to the position of the park brake, the park brake lamp switch being coupled between the common bus and ground for sinking the ignition position signal in its closed state.

2. A keyless entry system for a motor vehicle as claimed in claim 1, further comprising:
   a park brake lamp connected between the ignition position feed signal source and the enable input, being responsive to the state of the park brake lamp switch for turning on and off.

3. A keyless entry system for a motor vehicle as claimed in claim 2, wherein the door lock module is responsive to signal on the enable input for executing timed extinguishment of a dome light.

4. A keyless entry system for a motor vehicle as claimed in claim 1, further comprising:
- a daylight running lights module having an enable input tied to the common bus.

5. A keyless entry system for a motor vehicle, comprising:
- a sensor for generating a signal on an output indicating an ignition position;
- a chassis ground;
- a door lock module having an enable input coupled to the output from the sensor;
- a remote actuator for the door lock module;
- a park brake; and
- a switch connected by a first terminal to the enable input and by a second terminal to the chassis ground, said switch being opened and closed responsive to the position of the park brake, the switch sinking the ignition position signal when closed.

6. A keyless entry system for a motor vehicle as set forth in claim 5, further comprising a park brake lamp connected between the output from the sensor and the enable input to the door lock module.

7. A keyless entry system for a motor vehicle as set forth in claim 6, further comprising a daytime running tight control module having an enable input connected to the output from the sensor.

8. A keyless entry system for a motor vehicle as set forth in claim 7, the door lock module further comprising a dome lamp control mechanism having an enable input connected to the output for the ignition position signal.

9. A keyless entry system for a motor vehicle as set forth in claim 8, wherein the dome lamp control mechanism provides timed extinguishment of a vehicle dome light when the ignition position signal has been sunk by closure of the switch.

* * * * *